3,228,933
3-ENOL ETHERS OF 6-METHYL-3-OXO-$\Delta^4$-STEROIDS AND PROCESS FOR PREPARING SAME
David Neville Kirk and Vladimir Petrow, both of London, England, assignors to The British Drug Houses Limited
No Drawing. Filed Jan. 25, 1962, Ser. No. 168,794
Claims priority, application Great Britain, Feb. 22, 1961, 6,454/61
9 Claims. (Cl. 260—239.55)

This invention is for improvements in or relating to organic compounds and has particular reference to steroidal materials containing a carbon substituent at $C_6$.

It is an object of the present invention to provide a new and general process for the preparation of the 3-enol ethers of 6-methyl-3-oxo-$\Delta^4$-steroids of the androstane, 19-norandrostane, pregnane and 19-norpregnane series.

We have made the surprising discovery that 3-enolic ethers of 6-aminomethyl-3-oxo-$\Delta^4$-steroids of the androstane, 19-norandrostane, pregnane and 19-norpregnane series including general Formula I below may be converted by the process of this invention into the corresponding 3-enol ethers of 6-methyl-3-oxo-$\Delta^4$-steroids of the androstane, 19-norandrostane, pregnane and 19-norpregnane series including general Formula II below.

The process of this invention is a discovery of outstanding importance in the field of steroid technology. In the first place, many of the products of the present invention possess biological activity which renders them of value in, for example, the veterinary field. Thus for example, the 3-enol ethers of 6,17$\alpha$-dimethyltestosterone possess anabolic/androgenic activity when administered by the oral route. The 3-enol ethers of 17$\alpha$-acetoxy-6-methyl- and 17$\alpha$-acetoxy-6-methyl-16-methyleneprogesterone are potent orally-active progestational agents. The 3-enol ethers of 6-methyl cortisone have anti-inflammatory properties when administered by the oral route. In addition, certain of these ethers, e.g. the 3-n-propyl ether of 6-methylcortisone acetate, posses anti-inflammatory activity when administered parenterally.

In addition, the compounds of the present invention are of great value as intermediates for the preparation of other biologically active steroids. Thus, for example, they may be converted by hydrolysis into the corresponding 6$\alpha$-methyl-3-oxo-$\Delta^4$-steroids as indicated below:

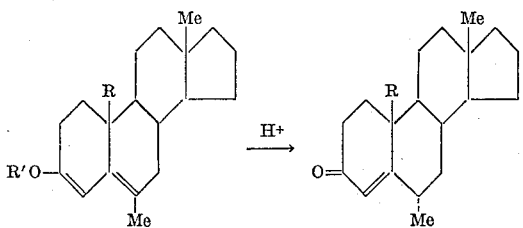

Such hydrolysis may be readily effected by, for example, treating the enol ether in ethanolic solution with a catalytic quantity of hydrochloric acid. The resulting 6$\alpha$-methyl-3-oxo-$\Delta^4$-steroids have established utility in the medicinal field as is well-known to those skilled in the art.

Another valuable use for the products of this invention is as intermediates for the preparation of 6-methyl-3-oxo-4,6-dienic steroids which materials have established utility as is well-known to those skilled in the art and into which the products of the invention (in which R is Me) may be converted, for example, by addition of halogen followed by dehalogenation as indicated below:

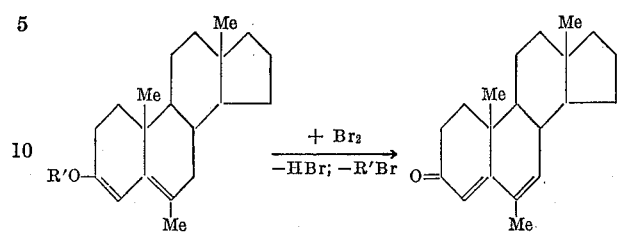

Alternatively the 6-methyl-3-enol ethers which form the products of this invention may be converted into the corresponding 6-methyl-3-oxo-4,6-dienic steroids by the action of chloranil and other similar quinonoidal oxidants.

Yet a further use for the products of this invention is as intermediates for the synthesis of other types of steroid materials, of which some may be expected to have valuable biological properties.. Thus, for example, they undergo conversion into enol acylates, oxidation with peracids, and ether interchange reactions.

It is a further object of the present invention to provide pharmaceutical preparations of the biologically-active materials.

The present invention provides new 3-enol ethers of 6-methyl-3-oxo-$\Delta^4$-steroids of the androstane, 19-norandrostane, pregnane and 19-norpregnane series including th Formula II below.

The invention provides the specific 3-enolic 6-methyl-3-oxo-$\Delta^4$-steroids:

17$\beta$-acetoxy - 3 - ethoxy - 6 - methylandrosta-3,5-diene, which is of value as an intermediate for the preparation of 6$\alpha$-methyltestosterone and its acyl derivatives.

17$\alpha$ - acetoxy - 3 - ethoxy - 6 - methylpregna - 3,5-dien-20-one which possesses progestational activity and is an intermediate for the preparation of 3-CO-$\Delta^{4,6}$-steroid derivatives.

6-methyl cortisone acetate 3-enol ethyl ether which possesses anti-inflammatory properties.

17$\alpha$,20:20,21 - bismethylenedioxy - 3 - ethoxy - 6-methylpregna - 3,5 - dien - 11$\beta$ - ol and 17$\alpha$,20:20,21 - bismethylenedioxy - 3 - ethoxy - 6 - methylpregna - 3,5-dien 11-one which are intermediates for the preparation of 6-methyl hydrocortisone into which they may be converted by careful hydrolysis under acidic conditions.

17$\alpha$ - acetoxy - 3 - methoxy - 6 - methyl - 16 - methylenepregna-3,5-dien-20-one and 17$\alpha$-acetoxy-3-methoxy-6,16$\alpha$-dimethylpregna-3,5-dien-20-one which possesses progestational activity and are intermediates for the preparation of 3-CO-$\Delta^{4,6}$-steroid derivatives.

3 - ethoxy - 16$\alpha$,17$\alpha$ - isopropylidenedioxy - 6 - methylpregna-3,5-dien-20-one which possess progestational properties and is an intermediate for the preparation of 3-CO-$\Delta^4$-steroid derivative which has progestational and claudogenic activity.

6,17$\alpha$ - dimethyl - 17$\beta$ - hydroxy - 3 - methoxyandrosta-3,5-diene and 17$\alpha$-ethyl-17$\beta$-hydroxy-3-methoxy-6-methyl-androsta-3,5-diene which possess anabolic/androgenic properties and are intermediates for the preparation of 3-CO-$\Delta^4$-steroid derivatives.

6 - methyl - 3 - ethoxypregna - 3,5,17(20)-trien-21-oate ethyl ester, 6-methyl-3-ethoxy-21-acetoxypregna-3,5,17-

(20)-triene and 3-ethoxy-6-methylandrosta-3,5-dien-17-one which are intermediates for the preparation of 3-CO-Δ⁴-steroid derivatives of value in 6-methyl steroid manufacture using methods of prior art. The last compound is also valuable for example propynylation at $C_{17}$ followed by careful acid hydrolysis of enol system to give dimethisterone.

6-methyl-cortisone acetate 3-enol (β-hydroxyethyl)-ether, 6-methyl cortisone acetate 3-enol cyclopentyl ether, 6-methyl cortisone acetate 3-enol cyclohexyl ether, 6-methyl cortisone acetate 3-enol (3'-phenylpropyl) ether, 6-methyl cortisone acetate 3-enol n-propyl ether, 6-methyl cortisone acetate 3-enol iso-propyl ether, 6-methyl cortisone acetate 3-enol n-butyl ether, 6-methyl cortisone acetate 3-enol sec.-butyl ether, 6-methyl cortisone acetate 3-enol n-amyl ether, 6-methyl cortisone acetate 3-enol n-hexyl ether and 6-methyl cortisone acetate 3-enol n-heptyl ether which possess anti-inflammatory properties and are intermediates for the preparation of 6-methyl cortisone acetate.

21 - acetoxy - 17α - hydroxy - 3 - methoxy - 6 - methylpregna - 3,5,9(11) - trien - 20 - one, 17α - hydroxy - 3 - methoxy - 6,21 - dimethylpregna - 3,5 - diene - 11,20-dione and 21 - acetoxy - 17α - hydroxy - 3 - methoxy - 6 - methylpregna-3,5,9(11)-trien-20-one which are intermediates for the preparation of 6-methyl corticoids.

16α,17α - epoxy - 3 - methoxy - 6 - methylpregna - 3,5-dien-20-one which is an intermediate for the preparation of medroxy progesterone acetate into which it may be converted by methods of prior art.

21 - acetoxy - 3 - ethoxy - 6 - methylpregna - 3,5 - dien-20-one which is an intermediate for the preparation of 6-methyldesoxycorticosterone acetate.

17β - acetoxy - 2α,6 - dimethyl - 3 - ethoxyandrosta-3,5-diene which is an intermediate for the preparation of 2α,6α-dimethyltestosterone.

6 - methyl - 3 - methoxy - 17β - acetoxy - 19 - norandrost-3,5-diene which is an intermediate for the preparation of 6-methyltestosterone and esters thereof.

3 - methoxy - 6 - methylandrosta - 3,5 - dien - 17-one which is an intermediate for the preparation of 3-CO-Δ⁴-steroid derivatives of value in 6-methyl steroid manufacture using methods of prior art and is also valuable for e.g. propynylation at $C_{17}$ followed by careful acid hydrolysis of enol system to give dimethisterone.

6-methyl cortisone acetate 3-enol benzyl ether which possesses anti-inflammatory properties and is an intermediate for the preparation of 6-methyl cortisone.

3 - ethoxy - 6,16α - dimethylpregna - 3,5 - dien - 20-one which possesses progestational properties.

6-methyl cortisone acetate 3-enol methyl ether which possesses anti-inflammatory properties and is an intermediate for the preparation of 6-methyl corticoids.

6-methylhydrocortisone acetate 3-enol methyl ether of value as anti-inflammatory agent.

3 - methoxy - 6 - methyloestra - 3,5 - dien - 17 - one of value on account of its anabolic/androgenic properties and as an intermediate for the preparation of 6-methyl-19-nor steroids into which it may be converted by methods of prior art, e.g. by ethynylation, chlorethynylation or reaction with Grignard reagents.

6-methylcortisone acetate 3-enol n-octyl ether of value as anti-inflammatory agent.

21 - acetoxy - 3 - methoxy - 6 - methylpregna - 3,5,17-(20)-trien-11-one of value as intermediate for the preparation of 6-methyl steroids, e.g. 6-methylcortisone into which it may be converted by hydrolysis to the known 3-CO-Δ⁴-derivatives.

6-methylcortisone 17α,21-acetonide 3-enol methyl ether and 6-methylcortisone acetate 3-enol-n-propyl ether of value on account of anti-inflammatory activity which is shown on oral and parenteral administration.

According to the present invention there is provided a process for the preparation of 3-enol ethers of 6-methyl-3-oxo-Δ⁴-steroids of the androstane, 19-norandrostane, pregnane and 19-norpregnane series including the formula

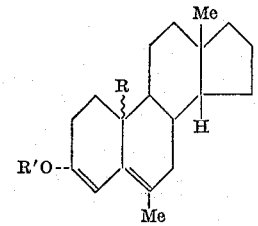

(II)

where R is Me or H and R' is alkyl, hydroxyalkyl, cycloalkyl, aralkyl or a functional derivative thereof which process comprises submitting a corresponding 3-enolic ether of a 6-aminomethyl-3-oxo-Δ⁴-steroid of the androstane, 19-norandrostane, pregnane or 19-norpregnane series including the formula

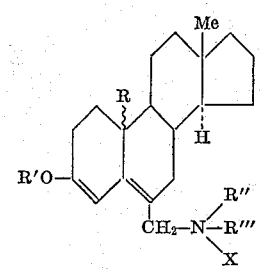

(I)

where R is Me or H, R' is alkyl, hydroxyalkyl, cycloalkyl or aralkyl, R'' is an alkyl group containing up to 6 carbon atoms, R''' is an alkyl group containing up to 6 carbon atoms or aryl or R'' and R''' together form a ring wherein —NR''R''' represents piperidino, pyrrolidino or morpholino and X is an electron pair or an electron pair associated with a borane or an electron pair associated with hydrogen or an electron pair associated with oxygen (viz. an N-oxide) or an electron pair associated with alkyl or alkaryl to a process of hydrogenolysis.

The process may be one of catalytic hydrogenolysis when the 3-enolic 6-aminomethyl starting material is reacted with Raney nickel or with Raney nickel, platinum or palladium catalysts and hydrogen or a source thereof to effect hydrogenolysis of the C—N bond.

Palladium charcoal in the presence of cyclohexene or other source of hydrogen including benzyl alcohol is particularly convenient and suitable for effecting hydrogenolysis of the C—N bond.

The starting material may be a 6-aminomethyl 3-enolic ether, or a borane complex thereof or acidic salt thereof or N-oxide thereof or quaternary salt thereof. In special cases it may be advisable to use other addition compounds of the 6-aminomethyl 3-enolic ethers such as, for example, the borontrifluoride addition complexes.

Quaternary salts are advantageously used as starting materials when Raney nickel is employed as reductant.

The free amines, their salts and borane complexes are advantageously employed when the palladium charcoal-cyclohexene type of reducing system is employed.

The preparation of 6-aminomethyl-3-enolic ethers (including general Formula I in which X is an electron pair) is described in our concurrently filed application No. 168,827, which process may be adapted in various ways as will be apparent to those skilled in the art. The preparation of the borane complexes of 6-aminomethyl-3-enolic ethers (including general Formula I in which X is an electron pair associated with a borane) and of salts of 6-aminomethyl-3-enolic ethers (including general Formula I in which X is an electron pair associated with hydrogen) are likewise described in our concurrently filed application No. 168,827.

The preparation of these materials is effected by, for example, treating the 3-enol ether of a 3-oxo-Δ⁴-steroid with phosgene and dimethylformamide (the Vilsmeier reagent) in an organic solvent such as methylene chloride at 0° C. and reducing the intermediate "iminium salt" with a borohydride in situ. Experimental conditions of reduction in which excess borane is present may lead to the formation of the borane complex corresponding to Formula I.

The preparation of quaternary salts of 6-aminomethyl-3-enolic ethers (including general Formula I in which X is an electron pair associated with alkyl or aralkyl) may be effected by standard methods well-known to those skilled in the art such, for example, as treating the foregoing 6-aminomethyl-3-enolic ethers (including general Formula I in which X is an electron pair) with a quaternating agent such as an alkyl or aralkyl halide, sulphate or p-toluene sulphonate in an organic solvent if so desired.

The preparation of N-oxides of the 6-aminomethyl-3-enolic ethers (including general Formula I in which X is an electron pair associated with oxygen) is effected by methods of prior art including reaction of the appropriate tertiary amine in methanol with hydrogen peroxide at room temperature.

The quaternary salts so obtained, and in particular the methochlorides, methobromides, methoacetates, methosulphates and other soluble salts, form pharmacologically-active agents in their own right and are of intrinsic importance on this account. Thus, for example, they may exhibit ganglion-blocking activity, hypotensive activity and C.N.S.-depressant activity, antibacterial activity. They may also show surface activity. Preparation of water/alcohol soluble quaternary salts from, for example, the less water/alcohol soluble methoiodides may be achieved by methods of prior art. Thus, for example, the finely powdered methoiodides may be shaken in water/alcohol suspension with an excess of freshly precipitated silver chloride at room temperature and, after anion interchange has occurred, the precipitated silver halides removed by filtration leaving the desired methochlorides in solution. The quaternary p-toluene sulphonates may be converted, for example, into methobromides by, for example, salting out from aqueous/alcoholic solution with excess potassium bromide.

It is well known to those skilled in the art that in general the ease of hydrogenolysis of the C—N bond may increase in passing from derivatives of teritary nitrogen to derivatives of quaternary nitrogen (see Houben-Weyl, "Methoden der Organischen Chemie," 4th ed., 1958, vol. XI/2, p. 640). It follows, therefore, that quaternary nitrogen derivatives such as the salts, borane addition complexes, quaternary salts and N-oxides derived from 6-aminomethyl 3-enolic ethers (including general Formula I in which X is :H, :O, :BH₃ or :Alkyl) form convenient starting materials for conversion into the 6-methyl 3-enolic ethers (including general Formula II). In particular quaternary derivatives including general Formula III

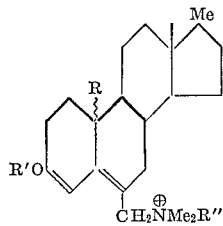

(where R″ is H, BH₃ or lower alkyl and R and R′ have the same meaning as above) are preferred owing to their ease of formation and hydrogenolysis.

HYDROGENOLYSIS

Raney nickel is a generally convenient reducing agent for effecting hydrogenolysis of the C—N bond. Its particular advantage lies in its ability to effect hydrogenolysis of the C—N bond without concomitant reduction of oxo and other readily reducible groups, including certain unsaturated linkages that may be present in the steroidal starting products. Thus, for example, by using Raney nickel in methanol as the reducing agent, 21-acetoxy-3-ethoxy-17α-hydroxy-6-trimethylaminomethylpregna-3,5-diene-11,20-dione iodide may be converted into the 3-enol ether of 6α-methylcortisone acetate in excellent yield and with no apparent concomitant reduction of the 11-oxo group, the ketol side chain or the unsaturated-conjugated system present in the material. It may be convenient, however, to use more powerful reducing agents in specific cases (see, for example, Houben-Weyl, loc. cit.).

Reduction of quaternary salts, in general, is readily effected employing 3 to 10 parts of Raney nickel in boiling methanol or ethanol, when reductive hydrogenolysis of the C—N bond is generally complete in 0.4 to 4.0 hours. Slow reaction, however occurs even at room temperature. Reduction is somewhat slower when acetone is employed as solvent. Addition of a buffer such as sodium acetate is, in general, advantageous. Pretreatment of the Raney nickel to remove alkaline impurities may be desirable when hydrogenolysing materials containing readily hydrolysable acyl groups, such for example as are present in 21-acylated corticoidal types. Such alkaline impurities may be removed from the Raney nickel by, for example, leaving it in contact with methyl or ethyl acetate/methanol for several hours at room temperature, before adding it to the steroidal starting material. Buffers such as (HOCH₂)₃C.NH₂/HCl at pH 6 to 8 may also be used for this purpose, or the pH of the solution may be controlled within these limits by addition of small quantities of, for example, acetic acid during the course of the reaction.

Reduction of (water/alcohol) soluble quaternary salts may be conveniently achieved by catalytic methods employing, for example, Raney nickel, palladium on charcoal or calcium carbonate, or platinum catalysts in the presence of hydrogen at pressures approximating to atmospheric pressure, and at room temperature. Addition of a buffering agent such as sodium acetate may be desirable. When using Pt or Pd catalysts hydrogenation is preferably continued until approximately the theoretical quantity of hydrogen has been absorbed. The catalyst is thereafter removed by filtration and the product recovered from the filtrate by standard methods of prior art.

As catalytic methods of reduction are less selective in some respects than is Raney nickel, attention will be required to avoid hydrogenation or hydrogenolysis of groups (which may be present in the material) other than the C—N groups. Thus, for example, bromine at $C_{16}$ or benzyloxy at $C_3$, in general, undergo partial or complete hydrogenolysis in the presence of Pd—C/H₂. Methylene and vinyl groups likewise undergo ready hydrogenation under these conditions. Unsaturated linkages at $C_{9(11)}$ are, in general, stable, but unsaturated linkages at $C_{11,12}$, $C_{14,15}$, $C_{15,16}$, $C_{16,17}$ and $C_{17,20}$ may, in general, suffer reduction. These facts will, of course, be apparent to those skilled in the art so that such operators of the invention will be able to so select the experimental conditions as to obtain the result required. Thus, for example, it may be desirable to generate the 6-methyl group concomitantly with reductive removal of Br at $C_{16}$ or reductive conversion of 16-methylene to 16-methyl.

Reduction of the free amines or their borane addition complexes may be effected as above, although hydrogenolysis of the C—N link is somewhat slower than in the case of the quaternary salts.

Reduction of the salts of the tertiary bases, in general, requires addition of a buffer such as sodium acetate (in order to neutralise the acidic component) prior to hydrogenolysis.

A particularly useful method for achieving hydrogenolysis of the C—N linkage comprises treating the 6-aminomethyl derivative and particularly its salt with a weak acid or its borane addition complex or its quaternary derivative with palladium charcoal in a hydroxylic solvent such as a lower aliphatic alcohol, in the presence of a source of hydrogen such for example as cyclohexene or benzyl alcohol. The reaction is conveniently performed at the boiling point of the solvent and in general within the temperature range of 30° C. to 120° C. Reduction of the free aminomethyl derivative is slow under these experimental conditions, but may be speeded up by the addition of a molar proportion of an acid such for example as benzoic acid which is not strong enough to effect hydrolysis of the resulting 6-methyl enol ether. The reaction may be performed in the presence of excess of, for example, acetic acid providing sufficient of a buffering agent such for example as sodium acetate is added to protect the resulting 6-methyl enol ether from hydrolysis. An especially convenient system for this purpose utilises acetic acid/sodium acetate in the ratio 1:3, the acetic acid being in excess over the molar proportion corresponding to the amine. Ethanol forms a convenient solvent. When a borane addition complex or a quaternary salt is being reduced by this process it is, in general, unnecessary to add acids as buffering agents to the mixture.

Reduction of N-oxide intermediates is conveniently performed employing palladium charcoal/hydrogen in a hydroxylic solvent such as a lower aliphatic alcohol.

SCOPE OF THE PROCESS OF THE INVENTION

The process of the invention is generally applicable to the 3-enol ethers of 6-aminomethyl steroids of the androstane, 9β,10α-androstane, 19-norandrostane, pregnane, 9β,10α-pregnane and 19-norpregnane series including general Formula I which may be additionally substituted by Hydroxyl or acyloxy groups at positions such as 11, 12, 16, 17, 18, 19, 20 and 21,
16-hydroxymethyl and 16-acyloxymethyl groups,
The condensation products of α-glycols, including 16α,17α-glycols with carbonyl components,
Carbonyl groups at positions such as 11, 12, 16, 17, 18, 20 and 21,
Carbalkoxy (carboxy) groups at $C_{13}$, $C_{16}$ and $C_{27}$ or in the side chain,
Alkyl groups and in particular Me groups at $C_2$, $C_{11}$, $C_{16}$, $C_{17}$ and $C_{21}$ and Et at $C_{17}$,
Alkenyl groups such as vinyl and allyl at $C_{17}$,
Methylene and ethylidene groups at $C_{11}$ and $C_{16}$, $C_{17}$,
Lactone, ether and spiroketal residues,
Fluorine groups at $C_9$, $C_{11}$, $C_{12}$, $C_{16}$, $C_{17}$ and $C_{21}$.

Similarly situated chlorine and bromine groups may undergo reductive removal during hydrogenolysis unless appropriately mild conditions are employed for the hydrogenolysis stage.

Unsaturated linkages at $C_{9(11)}$,
Acylated ketol groups,
Corticoid side chains when acylated, converted into the bismethylene dioxy-derivatives or cyclic carbonates.

The process of the invention may be used in the preparation of 6-aminomethyl 3-enol ethers of the following steroids and acyl derivatives thereof:

Testosterone, 2-methyltestosterone, 17α-methyltestosterone and their 9(11)-dehydro, 11-oxo and 11-hydroxy derivatives,
17α-acyloxyprogesterone and its 9(11)-dehydro, 11-oxo and 11-hydroxy derivatives,
16-methyl-17α-acyloxyprogesterone and its 9(11)-dehydro, 11-oxo and 11-hydroxy derivatives,
21 - fluoro - 16-methyl-17α-acyloxyprogesterone and its 9(11)-dehydro-, 11-oxo and 11-hydroxy derivatives,
16-methylene-17α-acyloxyprogesterone and its 9(11)-dehydro, 11-oxo and 11 hydroxy derivatives,
21-fluoro-16-methylene-17α-acyloxyprogesterone and its 9(11)-dehydro-, 11-oxo and 11-hydroxy derivatives,
17α-acyloxy-16-ethylideneprogesterone,
16α,17α-dimethylmethylenedioxyprogesterone and its 9(11)-dehydro, 11-oxo and 11-hydroxy derivatives,
Cortisone,
16-methylcortisone,
21-methylcortisone,
16-methylenecortisone,
16α-hydroxy cortisone and the (16α,17α)-acetonide thereof,
Hydrocortisone,
16-methylhydrocortisone,
21-methylhydrocortisone,
16-methylenehydrocortisone,
16α-hydroxyhydrocortisone and the (16α,17α)-acetonide thereof,
17α,21-dihydroxypregna-4,9(11)-diene-3,20-dione,
16α-hydroxy-17α,21-dihydroxypregna-4,9(11)-diene-3,20-dione,
21 - methyl - 17α,21-dihydroxypregna-4,9(11)-diene-3,20-dione,
16-methylene-17α,21-dihydroxypregna-4,9(11)-diene-3, 20-dione,
16α-hydroxy-17α,21-dihydroxypregna-4,9(11)-diene-3,20-dione and the (16,17) acetonide thereof,
21 - fluoro - 17α-hydroxypregna-4,9(11)-diene-3,20-dione and the (16,17) acetonide thereof,
21-fluoro-17α-hydroxypregn-4-ene-3,11,20-trione and the (16,17) acetonide thereof,
21-fluoro-11,17α-dihydroxypregn-4-ene-3,20-dione and the (16,17) acetonide thereof,
21-hydroxypregna-4,17(20)-dien-3-one,
11-oxo-21-hydroxypregna-4,17(20)-dien-3-one,
11,21-dihydroxypregna-4,17(20)-dien-3-one,
9(11)-dehydro-21-hydroxypregna-4,17(20)-dien-3-one,
3-oxopregna-4,17(20)-dienoic acid (esters),
3,11-dioxopregna-4,17(20)-dienoic acid (esters),
11-hydroxy-3-oxopregna-4,17(20)-dienoic acid (esters),
9(11)-dehydro-3-oxopregna-4,17(20)-dienoic acid (esters),
21-fluoro-17α-acyloxyprogesterone and the 9(11)-dehydro, 11-oxo and 11-hydroxy derivatives thereof,
Progesterone,
16-methylprogesterone,
16,17-methyleneprogesterone and 16,17-ethylidine progesterone,
11-oxoprogesterone,
9(11)-dehydroprogesterone,
21-methylprogesterone,
Diosgenone,
16-methyl-16,17-dehydroprogesterone,
16-carbalkoxyprogesterone,
16-hydroxymethylprogesterone,
3-(3-oxo-17β-hydroxyandrost-4-en-17α-yl)propionic acid,
21-fluoroprogesterone,
Androst-4-ene-3,17-dione and its 2α-methyl, 16β-methyl and 2α,16β-dimethyl derivatives,
Androst-4-ene-3,17-dione containing ring C groups including $\Delta^{9,11}$, 11-hydroxy and 11-oxo,
Testololactone.

Following is a description by way of example of methods of carrying the invention into effect.

EXAMPLE 1

(a) *Preparation of 17β-acetoxy-3-ethoxy-6-methylandrosta-3,5-diene*

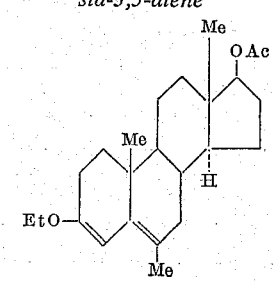

A solution of the 6-dimethylaminomethyl borane of 17β-acetoxy-3-ethoxyandrosta-3,4-diene (700 mgm.) (prepared as described in application No. 168,827) was heated under reflux in methanol (120 ml.) with Raney nickel sludge (4.5 g.) for a period of 2.5 hours. The cooled solution was then filtered and the Raney nickel washed with acetone. The combined filtrate and washings were evaporated under reduced pressure to dryness, and the residue was obtained crystalline by trituration with a few drops of acetone. Recrystallisation from moist acetone furnished 17β-acetoxy-3-ethoxy-6-methylandrosta-3,5-diene, which, on further recrystallisation from ethanol had M.P. 137 to 138° C., $[\alpha]_D^{21}$ —176.5°, $\lambda_{max}$. 247.5 m$\mu$ ($\epsilon$ 20,230) and was identical with an authentic specimen.

(b) *Preparation of 17β-acetoxy-6-methylandrosta-4,6-dien-3-one*

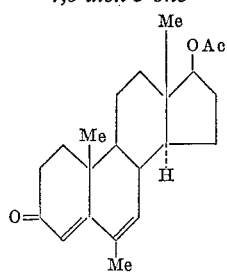

A solution of the above 6-methyl testosterone acetate 3-enol ethyl ether (1.24 g.) in methylenedichloride (10 ml.) was treated with bromine (0.57 g.) in methylenedichloride (5 ml.). The red mixture was allowed to stand for 30 minutes, then poured into water and the product isolated with ether. Crystallisation from acetone/hexane gave 17β-acetoxy-6-methylandrosta-4,6-dien-3-one, plates, M.P. 173 to 174° C., not depressed in admixture with an authentic specimen.

(c) *Preparation of 17β-acetoxy-6-methylandrosta-4,6-dien-3-one*

17β-acetoxy-3-ethoxy-6-methylandrosta-3,5-diene (1 g.) and chloranil (1.5 g.) were refluxed in tert.-butanol (20 ml.) for 3½ hours. The solution was diluted with ether, washed with dilute aqueous sodium hydroxide and water, dried over anhydrous sodium sulphate and evaporated to dryness under reduced pressure. Crystallisation of the residue from aqueous methanol afforded 17β-acetoxy-6-methylandrosta-4,6-dien-3-one as plates, M.P. 173 to 174° C., identical in every way with an authentic specimen.

(d) *Hydrolysis of 6-methyl testosterone acetate 3-enol ethyl ether*

A solution of 6-methyl testosterone acetate 3-enol ethyl ether (1 g.) in ethanol (5 ml.) was treated with four drops of concentrated hydrochloric acid, and the mixture heated on the steam-bath for 2 minutes. The product obtained on the addition of water was crystallised from aqueous methanol to give 6α-methyl testosterone acetate, needles, M.P. 140° C., not depressed in admixture with an authentic specimen.

EXAMPLE 2

*Preparation of 17α-acetoxy-3-ethoxy-6-methylpregna-3,5-dien-20-one*

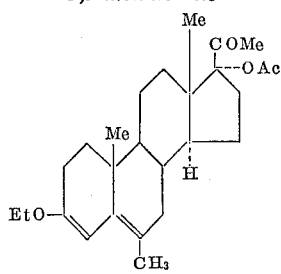

(a) 17α - acetoxy - 3 - ethoxy - 6 - dimethylaminomethylpregna-3,5-dien-20-one (2.3 g.) was added to Raney nickel (19 ml. of settled sludge, previously washed with 3 x 100 ml. of methanol) in methanol (50 ml.). The mixture was heated under reflux for 2 hours, filtered, and the nickel washed with hot methanol (100 ml.) and water (50 ml.). The combined filtrates were concentrated under reduced pressure until the product crystallised, when it was collected and purified from aqueous ethanol to give 17α-acetoxy-3-ethoxy-6-methylpregna-3,5-dien-20-one in needles, M.P. 167 to 169° C., $[\alpha]_D^{25}$ —160° (c., 0.99 in dioxan), $\lambda_{max}$. 247.5 m$\mu$ ($\epsilon$ 19,940) in ethanol, $\gamma_{max}$. (in CCl$_4$) 3076, 1739, 1715, 1649 and 1621 cm.$^{-1}$.

(b) 17α - acetoxy - 3 - ethoxy - 6 - dimethylaminomethylpregna-3,5-dien-20-one borane, treated by the process of the previous example, gave 17α-acetoxy-3-ethoxy-6-methylpregna-3,5-dien-20-one, M.P. 167 to 169° C.

(c) 17α - acetoxy - 3 - ethoxy - 6 - dimethylaminomethylpregna-3,5-dien-20-one (5 g.) in benzene (50 ml.) was warmed to 40 to 50° C., treated with methyl iodide (3 ml.) and allowed to stand for 5 hours. The product was collected and washed with ether. A sample purified from acetone/hexane gave 17α-acetoxy-3-ethoxy-6-trimethylammoniummethylpregna-3,5-dien-20-one iodide in needles, M.P. 170 to 178° C. (decomp.).

The foregoing compound (1 g.) was added to Raney nickel (6 ml. settled sludge, previously washed with 3 x 25 ml. methanol) in 25 ml. methanol containing sodium acetate (0.3 g.). The mixture was heated under reflux for ½ hour. The product was isolated as described above to give 17α-acetoxy-3-ethoxy-6-methylpregna-3,5-dien-20-one, M.P. 167 to 169° C.

(d) *Preparation of 17α-acetoxy-6-methylpregna-4,6-diene-3,20-dione*

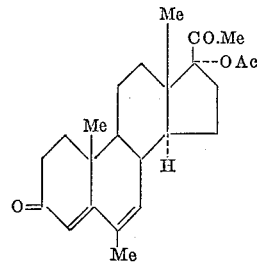

A solution of 17-α-acetoxy-3-ethoxy-6-methylpregna-3,5-dien-20-one (1 g.) and chloranil (1.5 g.) in tert.-butanol (25 ml.) was refluxed for 3 hours. The solution was diluted with ether, washed with dilute aqueous sodium hydroxide and water, dried over anhydrous sodium sulphate and evaporated to dryness under reduced pressure. The residue crystallised from aqueous methanol to give 17α-acetoxy-6-methylpregna-4,6-diene-3,20-dione as needles, M.P. 217 to to 219° C. $[\alpha]_D$ +12° (c., 0.75 in chloroform).

EXAMPLE 3

*Preparation of 6-methyl cortisone acetate 3-enol ethyl ether*

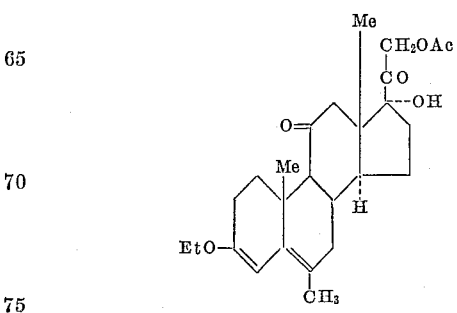

6-dimethylaminomethyl cortisone acetate 3-enol ethyl ether, treated by the process (c) of the previous example, gave the amine methiodide, needles from methanol (+0.2% pyridine), M.P. 188 to 196° C.

The amine methiodide (3.5 g.) was added to Raney nickel [18 ml. settled sludge, previously washed for 18 hours with methyl acetate (50 ml.) and methanol (50 ml.)] and sodium acetate (1.5 g.) in methyl acetate (20 ml.) and methanol (50 ml.). The mixture was heated under reflux for ½ hour, then solution was decanted through a filter. The nickel was treated with boiling methanol (50 ml.) for 5 minutes, then filtered, and the combined filtrates were diluted with water (30 ml.) and concentrated under reduced pressure. The separated solids were purified from aqueous ethanol to give 6-methylcortisone acetate 3-enol ethyl ether in solvated needles, M.P. 108 to 110° C. or 120 to 125° C. $[\alpha]_D^{26}$ −11° (c., 0.77 in dioxan), $\lambda_{max.}$ 246 to 247 m$\mu$ ($\epsilon$ 18,250) in ethanol, $\lambda_{max.}$ (in CCl$_4$), 3608, 3484, 3078, 1757, 1737, 1731, 1720, 1709, 1650 and 1622 cm.$^{-1}$.

The foregoing compound (1 g.) in acetic acid (10 ml.) containing concentrated hydrochloric acid (0.1 ml.) was stirred for 1 hour, then diluted with water to turbidity. More water was added dropwise as the product separated in crystalline form. Purification from acetone/hexane gave 6α-methyl cortisone acetate in prisms, M.P. 240 to 243° C.

EXAMPLE 4

*Preparation of 17α,20:20,21-bismethylenedioxy-3-ethoxy-6-methylpregna-3,5-dien-11β-ol*

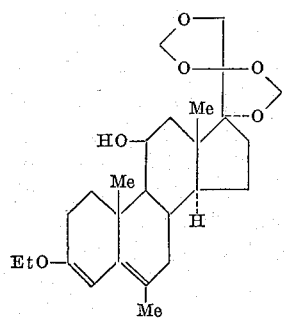

17α,20:20,21 - bismethylenedioxy - 6 - dimethylaminomethyl-3-ethoxypregna-3,5-dien-11β-ol [M.P. 168 to 171° C., $[\alpha]_D^{20}$ −152° (c., 0.95 in dioxan)

$\lambda_{max.}^{EtOH}$ 251 m$\mu$ ($\epsilon$ 20,170)

prepared as described in our application No. 168,827] was converted into the methiodide by treatment with methyl iodide in dry benzene, and the total product (2 g.) refluxed for ½ hour with Raney nickel (10 ml. of settled suspension) in methanol (50 ml.). The product was isolated as described in Example 1 and was precipitated from aqueous methanol to give 17α,20:20,21-bismethylenedioxy-3-ethoxy - 6-methylpregna-3,5-dien-11β-ol as a gel, M.P. 110 to 120° C.

EXAMPLE 5

*Preparation of 17β-acetoxy-3-ethoxy-6-methylandrosta-3,5-diene*

17β-acetoxy - 3-ethoxy-6(N - methyl-N - phenylaminomethyl)-androsta-3,5-diene (0.5 g.; prepared as described in our co-pending application No. 168,827) was refluxed for 2 hours in ethanol (50 ml.) with Raney nickel (3 ml. of settled suspension). The product was isolated as in Example 1 and crystallised from acetone/methanol containing a trace of pyridine to give 17β-acetoxy-3-ethoxy-6-methylandrosta-3,5-diene as needles, M.P. 137 to 138° C., identical with the product obtained in Example 1.

EXAMPLE 6

*Preparation of 17α,20:20,21-bismethylenedioxy-3-ethoxy-6-methylpregna-3,5-dien-11-one*

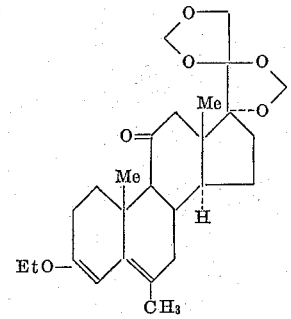

17α,20:20,21-bismethylenedioxy - 6 - dimethylaminomethyl-3-ethoxypregna-3,5-dien-11-one borane (2 g. of crude gum; prepared as described in our co-pending application No. 168,827) was refluxed for 1 hour in methanol (40 ml.) with Raney nickel (7 ml. of settled suspension). The product was isolated as described in Example 1 and chromatographed on alumina (50 g.) in benzene/ether (1:1). 17α,20:20,21-bismethylenedioxy-3-ethoxy-6-methylpregna-3,5-dien-11-one formed flakes from dichloromethane/methanol containing a trace of pyridine, M.P. 178 to 182° C., $[\alpha]_D$ −137.5 (c., 1.1 in dioxan)

$\lambda_{max.}^{EtOH}$ 250 m$\mu$ ($\epsilon$16,840)

EXAMPLE 7

*Preparation of 17α-acetoxy-3-methoxy-6-methyl-16-methylenepregna-3,5-dien-20-one*

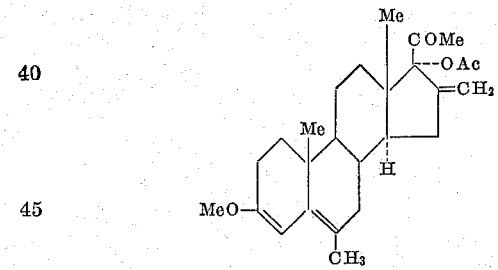

17α-acetoxy-6-dimethylaminomethyl - 3 - methoxy-16-methylenepregna-3,5-dien-20-one borane (3 g. crude gum prepared as described in our co-pending application No. 168,827) was refluxed for 3 hours in ethanol (50 ml.) with Raney nickel (12 ml. of settled suspension).

The product was isolated as in Example 1 and crystallised from dichloromethane/methanol containing a trace of pyridine to give 17α-acetoxy-3-methoxy-6-methyl-16-methylenepregna-3,5-dien-20-one, prisms, M.P. 202 to 205° C., $[\alpha]_D^{20}$ −255° (c., 1.7 in chloroform)

$\lambda_{max.}^{EtOH}$ 246 m$\mu$ ($\epsilon$19,890)

EXAMPLE 8

*Preparation of 17α-acetoxy-3-methoxy-6,16α-dimethylpregna-3,5-dien-20-one*

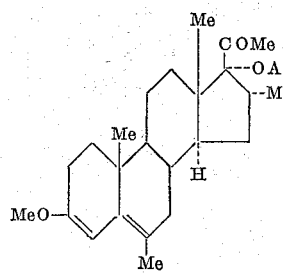

17α-acetoxy-3-methoxy-16α-methyl-6 - dimethylamino-methylpregna-3,5-dien-20-one borane (3 g.) (described in our co-pending application No. 168,827) was dissolved in methanol (200 ml.) and heated under reflux with Raney nickel (10 g.) for 3 hours. The nickel was removed by filtration and the filtrate evaporated. The product crystallised from methanol in plates to give 17α-acetoxy-3-methoxy-6,16α - dimethylpregna - 3,5-dien-20-one, M.P. 191 to 193° C., $[\alpha]_D^{19}$ —130° (c., 1.13)

$\lambda_{max.}^{EtOH}$ 246 to 247 m$\mu$ ($\epsilon$18,200)

EXAMPLE 9

*Preparation of 3-ethoxy-16α,17α-isopropylidenedioxy-6-methylpregna-3,5-dien-20-one*

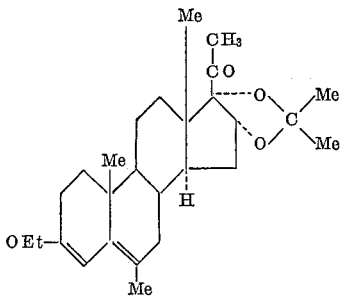

(a) Raney nickel sludge (15 ml.) was thrice washed with methanol (50 ml.), and a suspension of 6-dimethyl-aminomethyl-3-ethoxy-16α,17α - isopropylidenedioxypregna-3,5-dien-20-one borane (2 g.) (prepared as described in our co-pending application No. 168,827) in methanol (50 ml.) was added.

The mixture was refluxed whilst stirring for 2 hours, filtered whilst hot and the precipitate washed with hot methanol. The filtrate was evaporated under reduced pressure and the crystalline residue purified from ethanol to give 3-ethoxy-16α,17α-isopropylidenedioxy-6-methylpregna-3,5- dien-20-one as slender plates, M.P. 194 to 199° C., $[\alpha]_D^{23}$ —105° (c., 1.004 in doxan)

$\lambda_{max.}^{EtOH}$ 247 to 248 m$\mu$ ($\epsilon$19,600), $\gamma_{max.}^{Nujol}$ 1710, 1650, 1625 1210, 1050, 870 cm.$^{-1}$ (b) 6-dimethylaminomethyl - 3 - ethoxy - 16α,17α-isopropylidenedioxypregna-3,5-dien-20-one (0.5 g.; prepared as described in our co-pending application No. 168,827, now U.S. Patent No. 3,084,159) in benzene (20 ml.) was treated with methyl iodide (0.5 g.) and the mixture allowed to stand for 4 hours by which time it had set to a gel. Solvent was removed as far as possible under reduced pressure, and the gummy methiodide dissolved in methanol (10 ml.) and added to Raney nickel sludge (4 ml.) which had been thrice washed with methanol (10 ml.). The mixture was stirred, whilst refluxing for 2 hours, filtered whilst hot and the precipitate twice washed with small portions of methanol. The filtrate was evaporated under reduced pressure to give a gum. Crystallisation from aqueous ethanol gave 3-ethoxy-16α,17α-isopropylidenedioxy-6 - methylpregna - 3,5-dien-20-one, plates, M.P. 189 to 196° C., identical with material prepared by Method (a) above.

By procedures similar to (a) and (b) above, 3-methoxy, 3-n-propoxy, 3-n-butoxy, 3-n-heptyloxy and 3-cyclohexyl-oxy-6-dimethylaminomethyl - 16α,17α - isopropylidenedi-oxypregna-3,5-dien-20-one were prepared and converted respectively into 3-methoxy - 6 - methyl-16α,17α-isopropylidenedioxypregna-3,5-dien-20-one, M.P. 191 to 194° C., 3-n-propoxy-6-methyl-16α,17α - isopropylidenedioxypregna-3,5-dien-20-one, M.P. 185 to 192° C., and the corresponding 3-n-butoxy, 3-n-heptyloxy, and 3-cyclohexyloxy derivatives characterised by infrared absorption bands in the region of 1710, 1650, 1625 and 1205 cm.$^{-1}$. These compounds were characterised by anti-inflamatory and progestational activity.

EXAMPLE 10

*Preparation of 3-(3-ethoxy-17β-hydroxy-6-methyl-androsta-3,5-dien-17α-yl)propionic acid lactone*

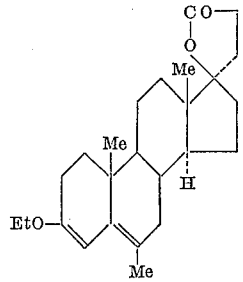

A mixture of 3-(6-dimethylaminomethyl-3-ethoxy-17β-hydroxyandrosta-3,5-dien-17α-yl)propionic acid lactone (3 g.) and methyliodide (5 ml.) in benzene (50 ml.) was left at room temperature for 4 hours. The gelatinous precipitate of methiodide was collected and used without purification.

A solution of the methiodide (3 g.) in methanol (100 ml.) was treated with Raney nickel sludge (30 ml. thrice washed with methanol) and the stirred mixture heated under reflux for 2 hours. The nickel was removed by filtration, washed with hot methanol (100 ml.) and the combined filtrate and washings taken to dryness in vacuo. The residue was purified to give 3-(3-ethoxy-17β-hydroxy-6-methylandrosta-3,5-dien-17α-yl)propionic acid lactone, $\lambda_{max.}$ 248 m$\mu$ (log $\epsilon$ 4.27), $\gamma_{max.}^{Nujol}$ 1650, 1620 cm.$^{-1}$

EXAMPLE 11

*Preparation of 6,17α-dimethyl-17β-hydroxy-3-methoxyandrosta-3,5-diene*

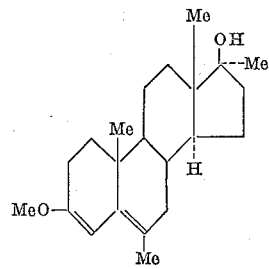

A solution of 6-dimethylaminomethyl-3-methoxy-17α-methyl-17β-propionoxyandrosta-3,5-diene borane (1 g.) in methanol (25 ml.) was treated with Raney nickel sludge (10 ml. thrice washed with methanol) and the stirred mixture refluxed for 2 hours. The product, 6,17α-dimethyl-3-methoxy-17β-propionoxyandrosta - 3,5-diene, was isolated by the method described in the previous example, and treated in dry tetrahydrofuran (50 ml.) with lithium aluminium hydride (0.4 g.) for 1 hour under reflux. A few drops of ethyl acetate were added to the cooled mixture, followed by saturated aqueous sodium sulphate (10 ml.). The mixture was shaken, decanted from inorganic salts, the solution dried over anhydrous sodium sulphate, and the solvent removed under reduced pressure. Crystallisation of the residue gave 6,17α-dimethyl-17β-hydroxy-3-methoxyandrosta-3,5-diene, $\lambda_{max.}$ 247.5 m$\mu$ (log $\epsilon$ 4.25), $\gamma_{max.}^{Nujol}$ 3400, 1650, 1620 cm.$^{-1}$

EXAMPLE 12

*Preparation of 17α-ethyl-17β-hydroxy-3-methoxy-6-methylandrosta-3,5-diene*

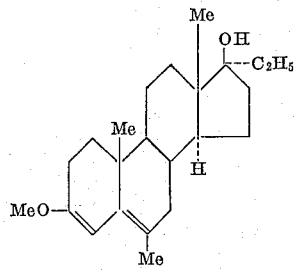

A mixture of 17β-acetoxy-6-dimethylaminomethyl-17α-ethyl-3-methoxyandrosta-3,5-diene (3.5 g.) and methyl iodide (6 ml.) in dry benzene (75 ml.) was left at room temperature for 3 hours. The resulting methiodide was collected, dissolved in methanol (120 ml.), Raney nickel sludge (40 ml., thrice washed with methanol) was added, and the stirred mixture heated under reflux for 2 hours. The product, 17β-acetoxy-17α-ethyl-3-methoxy-6-methylandrosta-3,5-diene, was isolated by the method described in Example 10, and treated with lithium aluminium hydride (0.5 g.) in dry tetrahydrofuran (80 ml) for 45 minutes under reflux. The product was isolated by the method described in the previous example, and purified to give 17α-ethyl-17β-hydroxy-3-methoxy-6-methylandrosta-3,5-diene, $\lambda_{max.}$ 248 m$\mu$ (log. $\epsilon$ 4.26), $\gamma_{max.}^{Nujol}$ 3400, 1650, 1620 cm.$^{-1}$

EXAMPLE 13

*Preparation of 6-methyl-3-ethoxypregna-3,5,17(20)-trien-21-oate ethyl ester*

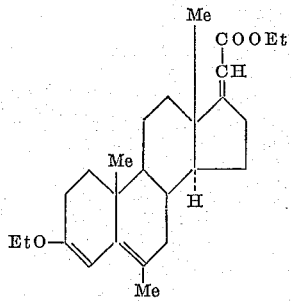

2.50 g. of 6-dimethylaminomethyl-3-ethoxypregna-3,5,17(20-trien-21-oate ethyl ester borane were added to a suspension of 20 ml. of a Raney nickel sludge, which had previously been washed with a 1:1 mixture of methanol and methyl acetate, in (50 ml.) of the same solvent mixture. The resulting mixture was heated under reflux for an hour, and filtered, the nickel being washed with the solvent mixture and with water. The combined filtrate and washings were stripped under reduced pressure, and the residue was purified by recrystallisation from methanol, M.P. 118 to 121° C. $[\alpha]_D^{26}$ +188.5° (c., 0.3034 in dioxan AR), $\lambda_{max.}$ 230 to 233 m$\mu$ ($\epsilon$ 22,660).

EXAMPLE 14

*Preparation of 6-methyl-3-ethoxy-21-acetoxypregna-3,5,17(20)-triene*

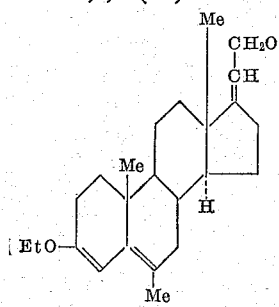

2.50 g. of 6-dimethylaminomethyl-3-ethoxy-21-acetoxy-pregna-3,5,17(20)-triene borane were added to a suspension of (20 ml.) of a Raney nickel sludge, which had previously been washed with 1:1 mixture of methanol and methyl acetate, in (50 ml.) of the same solvent mixture. The resulting mixture was heated under reflux for an hour, and filtered, the nickel being washed with the solvent mixture and with water. The combined filtrate and washings were stripped under reduced pressure, and the resulting gum, dissolved in benzene, was purified by chromatography onto alumina which had been previously treated with methyl acetate. Elution with benzene yielded 6-methyl-3-ethoxy-21-acetoxypregna-3,5,17(20)-triene as a pale yellow gum, $\gamma_{max.}^{CCl_4}$ 1740, 1680, 1650, 1622 (Infracord determination)

EXAMPLE 15

*Preparation of 3-ethoxy-6-methylandrosta-3,5-dien-17-one*

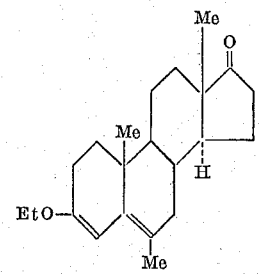

3-ethoxy-6-dimethylaminomethylandrosta - 3,5-dien-17-one (10 g.) in hexane (100 ml.) was treated with methyl iodide (4 ml.) for 24 hours at room temperature. The precipitated methiodide was collected and dried, and treated with Raney nickel (40 ml. of settled sludge, previously washed with methanol) in refluxing methanol (200 ml.) for 40 minutes. The hot mixture was filtered, the nickel was washed with acetone (100 ml.) and water (50 ml.) and the combined filtrates were evaporated under reduced pressure until the product separated out. Purification from aqueous ethanol gave 3-ethoxy-6-methyl-androsta-3,5-dien-17-one in needles, M.P. 135 to 138° C., $[\alpha]_D^{26}$ —113° (c., 1.00 in dioxan), $\lambda_{max.}$ 248 m$\mu$ ($\epsilon$ 20,830) in ethanol, $\gamma_{max.}$ (in CCl$_4$) 3075, 1743, 1649 and 1622 cm.$^{-1}$.

EXAMPLE 16

*Preparation of 6-methyl-cortisone acetate 3-enol (β-hydroxyethyl)-ether*

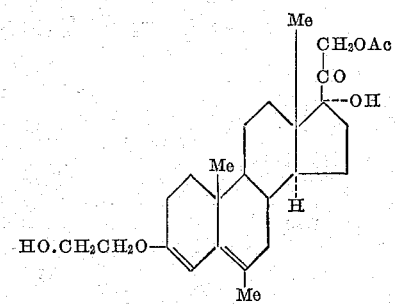

The procedure of the previous example, applied to 21-acetoxy-17α-hydroxy-3 - (β-hydroxyethoxy)-6-dimethyl-aminomethylpregna-3,5-diene-11,20-dione gave 6-methyl-cortisone acetate 3-enol (β-hydroxyethyl)-ether, prisms from aqueous acetone, M.P. 120 to 138° C., $[\alpha]_D^{25}$ +3.5° (c., 0.60 in dioxan), $\lambda_{max.}$ 246 m$\mu$ ($\epsilon$=16,260) in ethanol.

EXAMPLE 17

*Preparation of 6-methyl cortisone acetate 3-enol cyclopentyl ether*

The procedure of Example 3, applied to 21-acetoxy-3-cyclopentyloxy - 17α-hydroxy-6 - dimethylaminomethyl-prena-3,5-diene-11,20-dione gave 6-methyl cortisone acetate 3-enol cyclopentyl ether, prisms from aqueous methanol, M.P. 175 to 179° C., $[\alpha]_D^{26}$ —24° (c., 1.02 in dioxan) $\lambda_{max.}$ 249.5 m$\mu$ ($\epsilon$ 19,970) in ethanol, $\gamma_{max.}$ (in CCl$_4$) 3610, 3493, 3082, 1758, 1736, 1710, 1648, 1621 cm.$^{-1}$.

EXAMPLE 18

*Preparation of 6-methyl cortisone acetate 3-enol cyclohexyl ether*

Th procedure of Example 3, applied to 21-acetoxy-3-cyclohexyloxy-17$\alpha$-hydroxy - 6-dimethylaminomethylpregna-3,5-diene-11,20-dione, gave 6-methyl cortisone acetate 3-enol cyclohexyl ether, prisms from aqueous methanol, M.P. 174 to 177° C., $[\alpha]_D^{26}$ —17° (c., 0.89 in dioxan), $\lambda_{max.}$ 250.5 m$\mu$ ($\epsilon$ 19,450) in ethanol, $\gamma_{max.}$ (in CCl$_4$) 3605, 3492, 3076, 1757, 1734, 1710, 1648 and 1621 cm.$^{-1}$.

EXAMPLE 19

*Preparation of 6-methyl cortisone acetate 3-enol (3'-phenylpropyl) ether*

The procedure of Example 3, applied to 21-acetoxy-3-(3'-phenylpropyloxy)-17$\alpha$-hydroxy-6 - dimethylaminomethylpregna-3,5-diene-11,20-dione, gave 6-methyl cortisone, acetate 3-enol (3'-phenylpropyl) ether, M.P. 118 to 119° C., $\lambda_{max.}$ 250 m$\mu$ ($\epsilon$=19,570) in ethanol.

EXAMPLE 20

*Preparation of 6-methyl cortisone acetate 3-enol n-propyl ether*

The procedure of Example 3, applied to 21-acetoxy-3-n-propyloxy-17$\alpha$ - hydroxy-6 - dimethylaminomethylpregna-3,5-diene-11,20-dione, gave 6-methyl cortisone acetate 3-enol n-propyl ether, plates from aqueous methanol+1% pyridine, M.P. 163 to 165° C., $[\alpha]_D^{26}$ —14° (c., 1.12 in dioxan), $\lambda_{max.}$ 247.5 m$\mu$ ($\epsilon$=20,180) in ethanol, $\gamma_{max.}$ (in CCl$_4$), 3609, 3499, 3080, 1756, 1734, 1708, 1652 and 1622 cm.$^{-1}$.

EXAMPLE 21

*Preparation of 6-methyl cortisone acetate 3-enol iso-propyl ether*

The procedure of Example 3, applied to 21-acetoxy-3-isopropyloxy-17$\alpha$ - hydroxy-6 - dimethylaminomethylpregna-3,5-diene-11,20-dione, gave 6-methyl cortisone acetate 3-enol iso-propyl ether, prisms from aqueous ethanol, M.P. 163 to 164° C., $[\alpha]_D^{26}$ —15° (c., 0.93 in dioxan), $\lambda_{max.}$ 250 m$\mu$ ($\epsilon$=17,855) in ethanol, $\gamma_{max.}$ (in CCl$_4$), 3603, 3486, 3072, 1756, 1733, 1708, 1648 and 1619 cm.$^{-1}$.

EXAMPLE 22

*Preparation of 6-methyl cortisone acetate 3-enol n-butyl ether*

The procedure of Example 3, applied to 21-acetoxy-3-n-butyloxy-17$\alpha$-hydroxy-6-dimethylaminomethylpregna-3,5-diene-11,20-dione, gave 6-methyl cortisone acetate 3-enol n-butyl ether, needles, M.P. 161 to 163° C., $[\alpha]_D$ —15° (c., 1.25 in dioxan), $\lambda_{max.}^{EtOH}$ 247.5 m$\mu$ ($\epsilon$19,030)

EXAMPLE 23

*Preparation of 6-methyl cortisone acetate 3-enol sec-butyl ether*

The procedure of Example 3, applied to 21-acetoxy-3-sec-butyloxy-17$\alpha$-hydroxy - 6 - dimethylaminomethylpregna-3,5-diene-11,20-dione, gave 6-methyl cortisone acetate 3-enol sec-butyl ether, $\lambda_{max.}^{EtOH}$ 248 m$\mu$ ($\epsilon$19,080)

EXAMPLE 24

*Preparation of 6-methyl cortisone acetate 3-enol n-amyl ether*

The procedure of Example 3, applied to 21-acetoxy-3-n-amyloxy-17$\alpha$-hydroxy-6-dimethylaminomethylpregna-3-5-diene-11,20-dione, gave 6-methyl cortisone acetate 3-enol n-amyl ether, plates, M.P. 145 to 148° C., $[\alpha]_D$ —14° (c., 0.83 in dioxan), $\lambda_{max.}^{EtOH}$ 248 m$\mu$ ($\epsilon$19,190)

EXAMPLE 25

*Preparation of 6-methyl cortisone acetate 3-enol n-hexyl ether*

The procedure of Example 3, applied to 21-acetoxy-3-n-hexyloxy-17$\alpha$-hydroxy-6 - dimethylaminomethylpregna-3,5-diene-11,20-dione, gave 6-methyl cortisone acetate 3-enol n-hexyl ether, needles from aqueous methanol containing a few drops of pyridine of M.P. 114 to 117° C.

EXAMPLE 26

*Preparation of 6-methyl cortisone acetate 3-enol n-heptyl ether*

The procedure of Example 3, applied to 21-acetoxy-3-n-heptyloxy-17$\alpha$-hydroxy - 6 - dimethylaminomethylpregna-3,5-diene-11,20-dione, gave 6-methyl cortisone acetate 3-enol n-heptyl ether, needles, M.P. 127 to 130° C., $[\alpha]_D$ —11° (c., 0.99 in dioxan), $\lambda_{max.}^{EtOH}$ 247.5 m$\mu$

EXAMPLE 27

*Preparation of 21-acetoxy-17$\alpha$-hydroxy-3-methoxy-6-methylpregna-3,5,9(11)-trien-20-one*

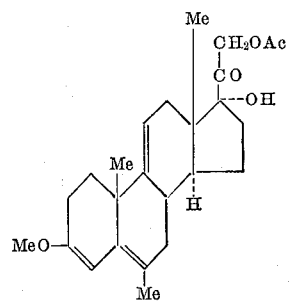

The procedure of Example 3, applied to 21-acetoxy-17$\alpha$ - hydroxy-3-methoxy-6-dimethylaminomethylpregna-3,5,9(11)-trien-20-one gave 21-acetoxy-17$\alpha$-hydroxy-3-methoxy-6-methylpregna - 3,5,9(11) - trien-20-one, $\lambda_{max.}$ 250 m$\mu$ ($\epsilon$=19,790) in ethanol.

EXAMPLE 28

*Preparation of 17$\alpha$-hydroxy-3-methoxy-6,21-dimethylpregna-3,5-diene-11,20-dione*

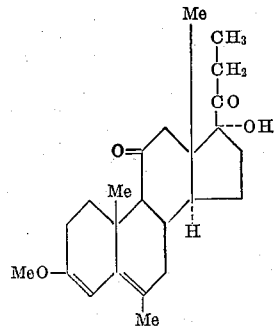

The procedure of Example 3, applied to 17$\alpha$-hydroxy-3-methoxy-21-methyl - 6 - dimethylaminomethylpregna-3,5-diene-11,20-dione gave 17$\alpha$-hydroxy-3-methoxy-6,21-dimethylpregna-3,5-diene-11,20-dione, $\lambda_{max.}$ 250 m$\mu$ ($\epsilon$=18,860) in ethanol.

EXAMPLE 29

*Preparation of 17β-acetoxy-3-ethoxy-6-methyl-androsta-3,5-diene*

A solution of 17β-acetoxy-6-dimethylaminomethyl-3-ethoxyandrosta-3,5-diene methacetate (prepared by treating 1 g. of the methiodide with silver acetate in methanol) in methanol (25 ml.) was hydrogenated at room temperature and pressure in the presence of 5% palladium on charcoal (0.2 g.) until 1 equivalent of hydrogen had been absorbed. The catalyst was removed by filtration and the product was isolated from the mother liquor by dilution with water. Crystallisation from aqueous methanol containing a trace of pyridine gave 17β-acetoxy-3-ethoxy-6-methylandrosta-3,5-diene, M.P. 136 to 138° C., $[\alpha]_D^{23}$ —175° (c., 0.75 in dioxan), identical with material prepared in Example 1.

EXAMPLE 30

*Preparation of 17β-acetoxy-3-ethoxy-6-methyl-androsta-3,5-diene*

A solution of 17β-acetoxy-6-dimethylaminomethyl-3-ethoxyandrosta-3,5-diene methacetate (prepared from 1 g. of the methiodide and silver acetate in methanol) in methanol (25 ml.) was shaken with hydrogen at room temperature and pressure in the presence of 5% palladium on calcium carbonate (0.2 g.) until adsorption of hydrogen ceased. The product crystallised from aqueous methanol containing a trace of pyridine to give 17β-acetoxy-3-ethoxy-6-methylandrosta-3,5-diene as needles, M.P. 136 to 138° C., $[\alpha]_D^{24}$ —173° (c., 0.8 in dioxan), identical with material prepared in Example 1.

EXAMPLE 31

*Preparation of 17α-acetoxy-3-ethoxy-6-methyl-pregna-3,5-dien-20-one*

A solution of 17α-acetoxy-6-dimethylaminomethyl-3-ethoxypregna-3,5-dien-20-one methobromide [prepared by treating the dimethylaminomethyl analogue (1 g.) with methyl bromide in dry benzene] and sodium acetate (0.5 g.) in methanol (25 ml.) containing 5% palladium on charcoal (0.2 g.) was shaken with hydrogen at room temperature and pressure until adsorption of hydrogen ceased. The catalyst was removed by filtration and water was added to the filtrate. 17α-acetoxy-3-ethoxy-6-methyl-pregna-3,5-dien-20-one separated as needles, M.P. 166 to 169° C., $[\alpha]_D^{25}$ —160° (c., 0.75 in dioxan), identical with the material prepared in Example 2.

EXAMPLE 32

*Preparation of 3-ethoxy-6-methylandrosta-3,5-dien-17-one*

3-ethoxy-6-dimethylaminomethylandrosta - 3,5-dien-17-one was converted into its methiodide as in Example 15. The methiodide (10 g.), silver acetate (4 g.), sodium acetate (4 g.) and methanol (200 ml.) were stirred together for 2 hours, filtered, and the filtrate, containing the quaternary ammonium acetate was hydrogenated over 5% palladium/charcoal catalyst (2.5 g.). The catalyst was filtered off and the filtrate concentrated to crystallisation. Purification from aqueous ethanol gave 3-ethoxy-6-methylandrosta-3,5-dien-17-one, M.P. 135 to 138° C., identical with the sample prepared by the process of Example 15.

EXAMPLE 33

*Preparation of 21-acetoxy-17α-hydroxy-3-methoxy-6 methylpregna-3,5,9(11)-trien-20-one*

21-acetoxy-17α-hydroxy-3-methoxy - 6 - dimethylamino-methylpregna-3,5,9(11)-trien-20-one, treated by the process of the foregoing example, gave 21-acetoxy-17α-hydroxy-3-methoxy - 6 - methylpregna - 3,5,9(11) - trien-20-one, $\lambda_{max}$ 250 mμ (ε=19,790) in ethanol.

EXAMPLE 34

*Preparation of 16α,17α-epoxy-3-methoxy-6-methyl-pregna-3,5-dien-20-one*

16α,17α-epoxy - 6 - dimethylaminomethyl - 3 - methoxy-pregna-3,5-dien-20-one, treated by the process of Example 32 gave 16α,17α-epoxy-3-methoxy-6-methylpregna-3,5-dien-20-one, needles from methanol M.P. 167 to 170° C., $[\alpha]_D^{25}$ —114° (c., 103 in dioxan), $\lambda_{max}$ 247 mμ (ε=19,720), $\lambda_{max}$ (in CCl₄) 3078, 1707, 1651 and 1626 cm.⁻¹.

EXAMPLE 35

*Preparation of 6-methyl cortisone acetate 3-enol cyclohexyl ether*

6-methyl cortisone acetate 3-enol ethyl ether (2 g.) (prepared by the process of Example 3), cyclohexanol (10 ml.) and benzene (300 ml.) were heated together under anhydrous conditions, half of the benzene being allowed to distil off. Toluene-p-sulphonic acid (8 mg., anhydrous) was added and distillation was continued for 40 minutes until most of the benzene had been removed. Pyridine (2 ml.) was added, and the solvents were completely removed at 0.5 mm. pressure on the steam-bath. The residue, purified from aqueous methanol, gave the 3-enol cyclohexyl ether, M.P. 174 to 177° C., identical with the sample prepared by the process of Example 18.

EXAMPLE 36

*Preparation of 21-acetoxy-3-ethoxy-6-methylpregna-3,5-dien-20-one*

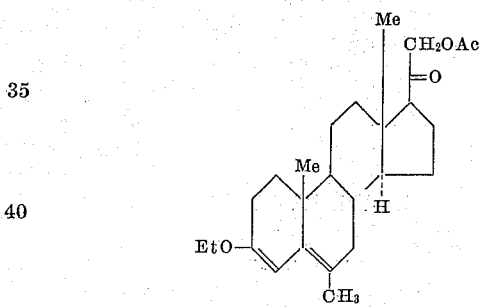

A solution of 21-acetoxy-6-dimethylaminomethyl-3-ethoxypregna-3,5-dien-20-one methacetate (2 g., prepared from the corresponding amine by treating its methiodide with silver acetate in methanol) and sodium acetate (1 g.) in methanol (50 ml.) was hydrogenated over 5% Pd–C (0.5 g.) at room temperature and pressure until 1 equivalent of hydrogen had been adsorbed. The product was isolated as described in Example 29 and crystallised from aqueous methanol containing a trace of pyridine to give 21-acetoxy-3-ethoxy-6-methylpregna-3,5-dien-2-one as prisms, M.P. 69 to 71° C., $[\alpha]_D^{21}$ —52.8° (c., 1.1 in dioxane), $$\lambda_{max}^{EtOH}\ 246.5\ m\mu\ (\epsilon = 19{,}730)$$

EXAMPLE 37

*Preparation of 17β-acetoxy-2α,6-dimethyl-3-ethoxyandrosta-3,5-diene*

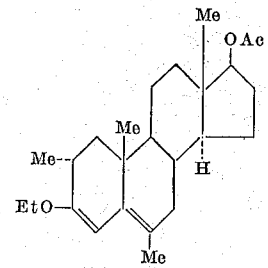

A mixture of 17β-acetoxy-6-dimethylaminomethyl-3-ethoxy-2α-methylandrosta-3,5-diene (1 g.), Raney nickel (5 ml.) and methanol (50 ml.) was refluxed for 7 hours, The product was isolated as described in Example 2, and crystallised from aqueous methanol to give 17β-acetoxy-2α,6-dimethyl-3-ethoxyandrosta-3,5-diene as needles, $\lambda_{max.}^{EtOH}$ 248 mμ (ε=19,750), $\gamma_{max.}^{Nujol}$ 1726, 1655 and 1620 cm.$^{-1}$

EXAMPLE 38

*Preparation of 6-methyl-3-methoxy-17β-acetoxy-19-norandrost-3,5-diene*

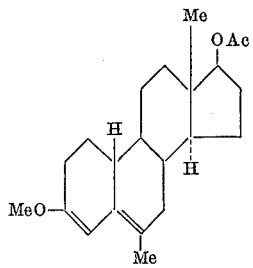

7.1 ml. of a solution of phosgene in ethylene dichloride (10% w./v.) were added dropwise to a stirred solution of 1.09 ml. of dimethylformamide in 10 ml. of ethylene dichloride at 0° C. After a further 10 minute stirring, a solution of 1.96 g. of 17β-acetoxy-3-methoxy-oestra-2,5(10)-diene (U.S. Patent No. 2,846,452), in 15 ml. of ethylene dichloride was added and the mixture was stirred at room temperature for 3 hours and treated with a solution of 0.40 g. of lithium borohydride in 20 ml. of tetrahydrofuran. The solution was poured into water and extracted with ether and the ether solution was washed with water, dried (Na₂SO₄) and evaporated. Recrystallisation from a mixture of methanol and acetone afforded 6-dimethylaminomethyl - 3 - methoxy-17β-acetoxy-19-norandrost-3,5-diene borane. 1.25 g. of 6-dimethylaminomethyl - 3-methoxy - 17β - acetoxy - 19-nor-androst-3,5-diene borane was dissolved in 10 ml. of piperidine and the mixture was refluxed for 4 hours. The piperidine was distilled off at reduced pressure and the residue was taken up in benzene and the benzene solution filtered. The filtrate was treated with 3 ml. of methyl iodide and allowed to stand overnight. The resulting precipitate was collected, dissolved in methanol and hydrogenated in the presence of 0.65 g. of anhydrous sodium acetate and 0.2 g. of palladium on charcoal catalyst. The catalyst was filtered off and the filtrate poured into water. The precipitate of 6-methyl-3-methoxy-17β-acetoxy-19-nor-androst-3,5-diene was collected and purified by chromatography on an alumina column which had been treated with ethyl acetate, eluting with benzene, $\gamma_{max.}^{Nujol}$ (Infracord determination) 1740, 1650, 1620, 1238 1207, 1170, 1042, 1022, $\lambda_{mxa.}$ 246.5 mμ

EXAMPLE 39

*Preparation of 3-methoxy-6-methylandrosta-3,5-dien-17-one*

6-dimethylaminomethyl - 3 - methoxyandrosta-3,5-dien-17-one was treated by the process of Example 32 to give 3-methoxy-6-methylandrosta-3,5-dien-17-one, M.P. 152 to 4° C., $[\alpha]_D^{22}$ —114° (c., 1.0 in dioxan), $\lambda_{max.}^{EtOH}$ 246.5 (ε=19650)

EXAMPLE 40

*Preparation of 6-methyl cortisone acetate 3-enol benzyl ether*

The procedure of Example 35 using benzyl alcohol in place of cyclohexanol applied to 21-acetoxy-3-benzyloxy-17α - hydroxy - 6 - dimethylaminomethylpregna-3,5-diene-11,20-dione gave 6-methylcortisone acetate 3-enol benzyl ether, M.P. 188 to 190° C., $[\alpha]_D^{25}$ —29° (c., 0.88 in chloroform), $\lambda_{max.}^{EtOH}$ 247 mμ (ε=21,080)

after purification from aqueous methanol.

EXAMPLE 41

*Preparation of 3-ethoxy-6,16α-dimethylpregna-3,5-dien-20-one*

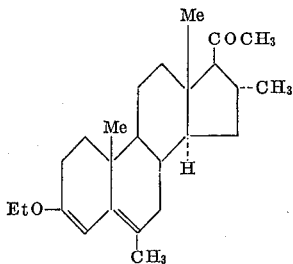

The procedure of Example 15 applied to 3-ethoxy-6-dimethylaminomethyl-16α-methylpregna - 3,5 - dien - 20-one gave 3-ethoxy-6,16α-dimethylpregna-3,5-dien-20-one, plates, M.P. 107 to 110° C., $[\alpha]_D$—66° (c., 1.3 in dioxan), $\lambda_{max.}^{EtOH}$ 247.5 mμ (ε20,090)

after purification from aqueous methanol.

EXAMPLE 42

*Preparation of 6-methyl cortisone acetate 3-enol methyl ether*

6-dimethylaminomethylcortisone acetate 3-enol methyl ether (10 g.) was dissolved in benzene (200 ml.) containing methyl bromide (3 ml.). After 24 hours the precipitated methobromide was collected, washed with ether, dried, and hydrogenated in methanol (200 ml.) containing sodium acetate (2 g.) over a 5% palladium/charcoal catalyst (3 g.) until one molar proportion of hydrogen had been absorbed. The catalyst was removed and the filtrate was diluted with methylene chloride and washed with water, dried (Na₂SO₄) and the solvents removed. Purification from aqueous methanol gave 6-methyl cortisone acetate 3-enol methyl ether in flakes, M.P. 178 to 180° C., $[\alpha]_D^{25}$ —12.5° (c., 0.98 in dioxan), $\lambda_{max.}^{EtOH}$ 246 mμ (ε17,650), $\gamma_{max.}$ (in CCl₄), 3608, 3490 3079, 1756, 1735, 1709, 1654 and 1626 cm.$^{-1}$

EXAMPLE 43

*Preparation of 17β-acetoxy-3-ethoxy-6-methylandrosta-3,5-diene*

17β-acetoxy-3 - ethoxy - 6 - dimethylaminomethylandrosta-3,5-diene borane (1 g.) was hydrogenated in methanol (50 ml.) over 5% palladium/charcoal catalyst (0.5 g.). After an initial absorption of hydrogen the volume of hydrogen increased due to interaction of liberated borane with the solvent. When no further change in volume occurred the catalyst was removed and the solvent evaporated. Purification from aqueous ethanol gave 17β-acetoxy-3-ethoxy-6-methylandrosta-3,5-diene, M.P. 137 to 138° C.

EXAMPLE 44

*Preparation of 6-methylhydrocortisone acetate 3-enol methyl ether*

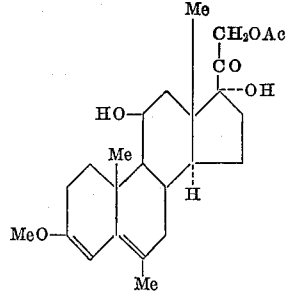

6 - dimethylaminomethylhydrocortisone 21 - acetate 3-enol methyl ether (1 g.), acetic acid (1 ml.), sodium acetate (3 g.), 5% palladium-charcoal (250 mg.), cyclohexene (2 ml.) and ethanol (25 ml.) were stirred and heated under reflux for 2½ hours, then the catalyst was removed by filtration and washed with hot methanol. The filtrates were poured into water and extracted with ether which was washed with sodium hydrogen carbonate solution and water, dried ($Na_2SO_4$) and evaporated. The residue, purified from aqueous methanol+1% pyridine, gave 6-methylhydrocortisone acetate 3-enol methyl ether, $\lambda_{max.}$ 247 m$\mu$ ($\epsilon$ 18,165) in ethanol.

In the same way, employing as as the starting material 6-dimethylaminomethylhydrocortisone 21-acetate 3 - enol ethyl ether, the product was 6-methylhydrocortisone acetate 3-enol ethyl ether prisms, M.P. 166 to 170° C., $[\alpha]_D^{23}$ —37° (c., 1.02 in dioxan), $\lambda_{max.}$ 247 to 250 m$\mu$ ($\epsilon$ 20,065) in ethanol, $\gamma_{max.}$ 247 to 250 m$\mu$ ($\epsilon$=20,065) in ethanol.

EXAMPLE 45

*Preparation of 3-methoxy-6-methyloestra-3,5-dien-17-one*

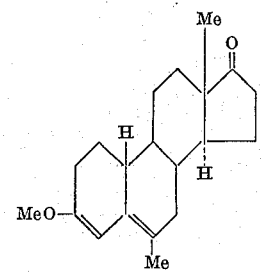

3-methoxy-6-dimethylaminomethyloestra-3,5-dien - 17- one (2 g.), benzoic acid (0.6 g.) (0.85 mol.), 5% palladium/charcoal (0.5 g.), cyclohexene (2 ml.) and ethanol (30 ml.) were stirred and heated under reflux for 2 hours, then the catalyst was removed by filtration, and the filtrate diluted with water and extracted with ether. The ether was washed with 5% succinic acid solution, water, 5% sodium carbonate solution, and water, dried ($Na_2SO_4$) and evaporated. The residue was purified from aqueous methanol to give 3-methoxy-6-methyloestra-3,5-dien-17-one in needles, M.P. 153 to 155° C., $[\alpha]_D^{26}$ —145° (c., 1.01 in dioxan), $\lambda_{max.}$ 247 m$\mu$ ($\epsilon$ 19,470) in ethanol, $\gamma_{max.}$ (in $CCl_4$) 3080, 1743, 1652 and 1625 cm.$^{-1}$.

The process was similarly employed for the preparation of the corresponding ethyl, propyl, butyl, pentyl, hexyl, heptyl, benzyl and other 3-enol ethers of 6-methyl-19-norandrost-4-ene-3,17-dione.

EXAMPLE 46

*Preparation of 6-methylcortisone acetate 3-enol n-octyl ether*

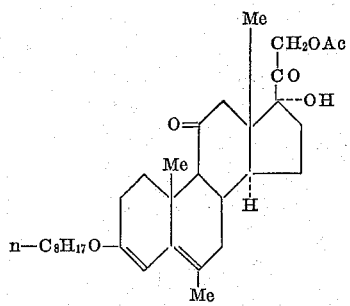

6-dimethylaminomethylcortisone acetate 3-enol n-octyl ether treated by the process of Example 45 gave 6-methylcortisone acetate 3-enol n-octyl ether, needles from aqueous methanol+1% pyridine, M.P. 119 to 121° C., $[\alpha]_D^{25.5}$ —7° (c., 0.87 in dioxan), $\lambda_{max.}$ 246 to 248 m$\mu$ ($\epsilon$ 18,080) in ethanol.

EXAMPLE 47

*Preparation of 6-methyltestosterone acetate 3-enol methyl ether*

6-piperidinomethyltestosterone acetate 3 - enol methyl ether (1 g.) treated by the process of Example 44 gave 6-methyltestosterone acetate 3-enol methyl ether.

EXAMPLE 48

*Preparation of 6-methylestosterone acetate 3-enol methyl ether*

6 - dimethylaminomethyltestosterone acetate 3 - enol methyl ether borane adduct (2 g.), 5% palladium-charcoal (0.5 g.), cyclohexene (4 ml.) and ethanol (30 ml.) were heated and stirred under reflux for 4 hours, then the catalyst was removed by filtration, the filtrate concentrated to about 10 ml., and water added to turbidity. The crystalline product was purified from aqueous methanol to give 6-methyltestosterone acetate 3-enol methyl ether, identical with the product in Example 47.

EXAMPLE 49

*Preparation of 21-acetoxy-3-methoxy-6-methylpregna-3,5,17(20)-trien-11-one*

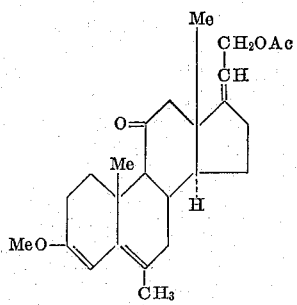

21-acetoxy-3-methoxy-6 - dimethylaminomethylpregna-3,5,17(20)-trien-11-one treated by the process of Example 44 gave 21-acetoxy-3-methoxy - 6 - methylpregna-pyridine, M.P. 157 to 163° C., $[\alpha]_D^{24}$ —55° (c., 1.06 in ethanol.

EXAMPLE 50

*Preparation of 6-methylcortisone 17α,21-acetonide 3-enol methyl ether*

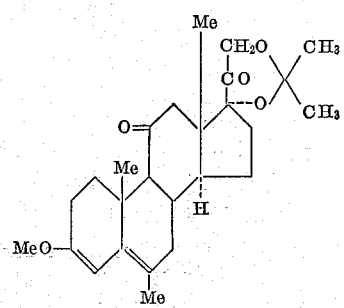

6-dimethylaminomethylcortisone 17α,21 - acetonide 3-enol methyl ether treated by the process of Example 42 gave 6-methylcortisone 17α,21-acetonide 3-enol methyl ether, triangular clusters of prisms from ethanol+1% pyridine, M.P. 157 to 163° C., $[\alpha]_D^{24}$ —55° (c., 1.06 in dioxan ), $\lambda_{max.}$ 246.5 m$\mu$ ($\epsilon$=18,170).

EXAMPLE 51

*Preparation of 6-methylcortisone acetate 3-enol-n-propyl ether*

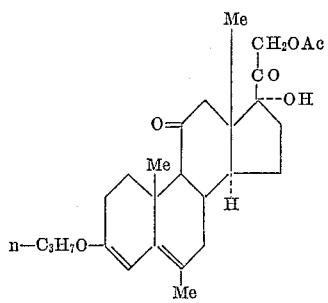

Cortisone acetate 3-enol-n-propyl ether (Ercoli and Gardi, J. Amer. Chem. Soc., 1960, 82, 746) (25 g.) in methylene chloride (150 ml.) and pyridine (1 ml.) was added to the complex prepared at 0° C. from phosgene (10.8 g.) in methylene chloride (150 ml.) and dimethylformamide (25 ml.) in methylene chloride (100 ml.). After stirring for 1 hour at 0° C. the solution was diluted with methylene chloride (200 ml.), phenazone (20.5 g.) was added, then the stirred mixture was treated dropwise over 15 minutes with a solution of lithium borohydride (1.32 g.) in anhydrous tetrahydrofuran (100 ml.). The solution was then poured into water (1 l.) containing sodium carbonate (15 g.), and extracted with ether (750 ml.). The organic layer was washed with water twice, then the basic product was extracted into 5% aqueous succinic acid solution (four portions of 100 ml. each). The combined succinic acid solutions were washed once with ether (50 ml.), then poured into water containing sodium carbonate (30 g.), and the product extracted into ether. The ether was washed four times with water, dried ($Na_2SO_4$) and evaporated, to give 21-acetoxy-17$\alpha$-hydroxy-6-dimethylaminomethyl-3-propyloxypregna-3,5-diene-11,20-dione, $\lambda_{max}$. 249 m$\mu$.

This crude 6-dimethylaminomethyl derivative (19.5 g.), benzoic acid (4.7 g.), 5% palladium-charcoal (5 g.), cyclohexene (27.5 ml.) and ethanol (200 ml.) were stirred together and heated under reflux for 2½ hours, then the catalyst was collected on a filter and washed with hot methanol, and the combined filtrates were poured into water 1 l.) containing succinic acid (10 g.). The product was extracted with ether, which was washed with water, sodium hydrogen carbonate solution, and water, dried ($Na_2SO_4$) and the solvents removed. The residue was purified from aqueous methanol +1% pyridine to give 6-methylcortisone acetate 3-enol-n-propyl ether, plates, M.P. 172 to 175° C., $[\alpha]_D^{23}$ —14° (c., 1.08 in dioxan), $\lambda_{max}$. 274 m$\mu$ ($\epsilon$ 18,890) in ethanol, identical with the product from Example 20.

EXAMPLE 52

*Preparation of 6,16$\alpha$-dimethylcortisone acetate 3-enol n-propyl ether*

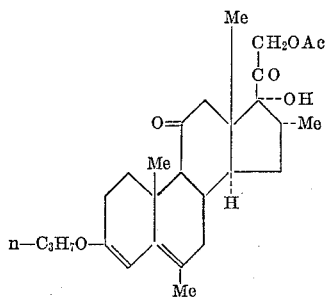

16$\alpha$-methylcortisone acetate (20 g.) was treated with ethyl orthoformate (20 ml.) and toluene-p-sulphonic acid (1 g.) in dioxan (200 ml.) for 30 minutes at room temperature, then the mixture was poured into a mixture of benzene (1 l.) and n-propanol (500 ml.), from which ca. 60 ml. had previously been distilled to remove traces of water. Slow distillation was continued for 2½ hours (500 ml. distillate collected) then pyridine (5 ml.) was added and the solvents were removed in vacuo. The residue was purified from aqueous methanol+1% pyridine to give 16$\alpha$-methylcortisone acetate 3-enol n-propyl ether, $\lambda_{max}$. 238 m$\mu$ ($\epsilon$ 20,180) in ethanol.

The foregoing compound, treated by the process of Example 51, gave the 6-dimethylaminomethyl derivative, $\lambda_{max}$. 249.5 m$\mu$ ($\epsilon$ 19,150) in ethanol, which was hydrogenolysed by the process of Example 51 to give 6,16$\alpha$-dimethylcortisone acetate 3-enol n-propyl ether, $\lambda_{max}$. 274 m$\mu$ ($\epsilon$ 18,920) in ethanol, $\lambda_{max}$. (in $CCl_4$) 3604, 3487, 3077, 1756, 1733, 1707, 1649 and 1619 cm.$^{-1}$.

EXAMPLE 53

*Preparation of 6,16$\beta$-dimethylcortisone acetate 3-enol n-propyl ether*

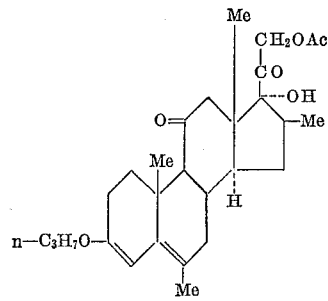

16$\alpha$-methylcortisone acetate was treated by the process of Example 52 to give its 3-enol n-propyl ether, $\lambda_{max}$. 328 m$\mu$ ($\epsilon$ 20,040) in ethanol which was converted into its 6-dimethylaminomethyl derivative, $\lambda_{max}$. 249.5 m$\mu$ ($\epsilon$ 18,700) in ethanol, which was reduced to give 6,16$\beta$-dimethylcortisone acetate 3-enol n-propyl ether, $\lambda_{max}$. 247.5 m$\mu$ ($\epsilon$ 19,000) in ethanol, $\lambda_{max}$. (in $CCl_4$) 3608, 3498, 3080, 1755, 1734, 1707, 1650 and 1621 cm.$^{-1}$.

EXAMPLE 54

*Preparation of 6-methylcortisone acetate 3-enol $\beta$-chloroethyl ether*

Cortisone acetate 3-enol $\beta$-chloroethyl ether (U.S. Patent No. 3,099,858), treated by the process of Example 51, gave 6-methylcortisone acetate 3-enol $\beta$-chloroethyl ether, $\lambda_{max}$. 247.5 m$\mu$ ($\epsilon$=19,840) in ethanol.

EXAMPLE 55

*Preparation of 17$\alpha$-acetoxy-3-methoxy-6-methylpregna-3,5-diene-20-one*

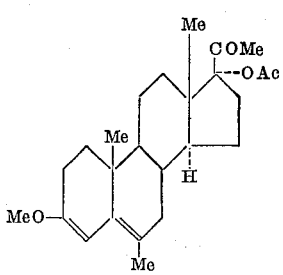

17α - acetoxy - 3 - methoxy - 6 - dimethylaminomethyl-pregna - 3,5 - dien - 20 - one treated by the process of Example 48 gave 17α-acetoxy-3-methoxy-6-methylpregna-3,5-dien-20-one, prisms from methanol, M.P. 216 to 220° C., [α]$_D^{25}$ —167° (c., 0.89 in dioxan), λ$_{max.}$ 247 mμ (ε 17,620) in ethanol.

EXAMPLE 56

*Preparation of tablets each containing 4 mg. of 6-methyl-cortisone acetate 3-n-propyl enol ether*

| | Mg. |
|---|---|
| 6-methyl cortisone acetate 3-n propylenol ether | 4 |
| Lactose | 80 |
| Sodium bicarbonate | 25 |
| Starch paste 10% w./w., a sufficient quantity. | |
| Magnesium stearate | 1.3 |
| Starch, sufficient to produce | 129.6 |

The medicament was thoroughly mixed dry with about a quarter of the lactose and the pre-mix so formed diluted by gradual addition of the remainder of the lactose and the sodium bicarbonate, followed by two thirds of the starch. A suitable quantity of starch paste was used to granulate the mixture and the granulation subsequently tray dried at 50° C. The resultant granules were processed through a 20 mesh sieve and the lubricant (magnesium stearate) added, together with sufficient starch to produce the required weight. Tablets each weighing 129.5 mg. were compressed from this mixture.

EXAMPLE 57

*Preparation of 17α-acetoxy-3-methoxy-6-methylpregna-3,5-dien-20-one*

17α - acetoxy - 6 - dimethylaminomethyl - 3 - methoxyprogna-3,5-dien-20-one (5 g.) in ethanol (100 ml.) was treated with 30% hydrogen peroxide (20 ml.) for 4 days at room temperature. Water (500 ml.) was added, and the mixture was extracted with ether (100 ml.) which was rejected. The aqueous layer was extracted with methylene chloride (6x25ml.) and the combined extracts were washed with water (25 ml.), dried Na$_2$SO$_4$) and the solvents evaporated under reduced pressure. The residue was triturated with acetone to give the N-oxide, M.P. 116 to 119° C.

This N-oxide (1 g.) in methanol (25 ml.) was added to a pre-reduced 5% palladium-charcoal catalyst (200 mg.) in methanol (25 ml.) and hydrogenated until reaction almost ceased after about 70 ml.) had been absorbed. The catalyst was removed by filtration and the filtrate diluted with water. The precipitated solids were purified from methanol to give 17α-acetoxy-3-methoxy-6-methylpregna-3,5-dien-20-one, M.P. 216 to 220° C., identical with the product of Example 55.

EXAMPLE 58

*Preparation of 3-methoxy-6-methyl-9β,10α-pregna-3,5-dien-20-one*

A mixture of 6-dimethylaminomethyl-3-methoxy-9β,10α-pregna-3,5-dien-20-one (0.5 g.), acetic acid (0.5 ml.), sodium acetate (1.5 g.), 5% palladium-charcoal (0.1 g.), cyclohexene (2 ml.) and ethanol (10 ml.) was stirred and heated under reflux for 3 hours. The product, isolated as in Example 44, contained 3-methoxy-6-methyl-9β, 10α-pregna-3,5-dien-20-one, having λ$_{max.}^{EtOH}$ 248 mμ (ε 18,100) and γ$_{max.}^{Nujol}$ 1710, 1650, and 1625 cm.$^{-1}$

We claim:

1. A process for the preparation of a 6-methyl-3-enol ether of a 3-oxo-Δ$^4$ of the androstane, 19-norandrostane, pregnane and 19-norpregnane series comprising subjecting a corresponding 3-enolic ether of a 6-aminomethyl-3-oxo-Δ$^4$-steroid in solution to hydrogenolysis with a source of activated hydrogen to convert the 6-aminomethyl group to a 6-methyl group.

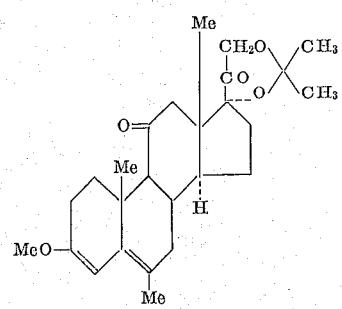

2. A process as claimed in claim 1 wherein the 3-enolic ether of the 6-aminomethyl-3-oxo-Δ$^4$-steroid is reacted with a reagent selected from the group consisting of Raney nickel, hydrogen in the presence of a catalyst selected from the group consisting of Raney nickel, platinum and palladium, and a hydrogen donor in the presence of a catalyst selected from the group consisting of Raney nickel, platinum and palladium.

3. A process as claimed in claim 1 wherein a steroid selected from the group consisting of a 3-enolic ether of the 6-aminomethyl-3-oxo-Δ$^4$-steroid, an acidic salt and a borane complex thereof is reacted with palladium charcoal in the presence of a source of hydrogen selected from the group consisting of cyclohexene and benzyl alcohol.

4. A process as claimed in claim 3 wherein the steroid starting material is treated with palladium charcoal in a lower aliphatic alcohol in the presence of a source of hydrogen selected from the group consisting of cyclohexene and benzyl alcohol at a temperature between 30° C. and 120° C.

5. A process as claimed in claim 1 wherein a quaternary salt of the 3-enolic ether of the 6-aminomethyl-3-oxo-Δ$^4$-steroid is reacted with Raney nickel.

6. A process for the preparation of 3-enol ethers of 6-methyl-3-oxo-Δ$^4$-steroids of the androstane, 19-norandrostane, pregnane and 19-norpregnane series having in rings A and B of the steroid nucleus the following structure:

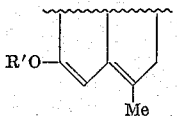

where R' is selected from the group consisting of alkyl, hydroxyalkyl, cycloalkyl and aralkyl, which process comprises subjecting in solution to hydrogenolysis with a source of activated hydrogen a corresponding 3-enolic ether of a 6-aminomethyl-3-oxo-Δ$^4$-steroid having in rings A and B of the steroid nucleus the structure

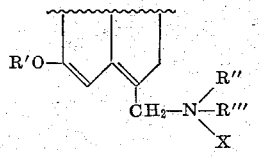

where R' is defined above, R'' and R''' are selected from the group consisting of (a) R''—N—R''' wherein R'' and R''' are each alkyl containing up to 6 carbon atoms, (b) R''—N—R''' wherein R'' is alkyl containing up to 6 carbon atoms and R''' is aryl, and (c) R'' and R''' are joined and together with the nitrogen atom to which they are attched form a ring selected from the group consisting of piperidine, pyrolidine and morpholine, and X is selected from the group consisting of an electron pair and an electron pair associated with a member of the group consisting of hydrogen, oxygen, BH$_3$ alkyl and aralkyl, to thereby split the C-N linkage of the 6-aminomethyl group and provide the 6-methyl substituent.

7. 21 - acetoxy - 3 - ethoxy - 6 - methylpregna - 3,5-dien-20-one.

8. 6-methylcortisone 17α,21-acetonide 3-enol methyl ether.

9. A compound of the formula

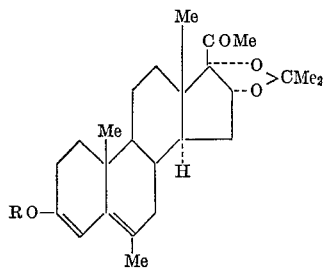

where R is selected from the group consisting of aliphatic and alicyclic radicals containing up to 7 carbon atoms.

References Cited by the Examiner

UNITED STATES PATENTS

| | | | |
|---|---|---|---|
| 2,888,457 | 5/1959 | Beylor et al. | 260—239.55 |
| 3,009,858 | 11/1961 | Ercoli | 167—65 |
| 3,019,241 | 1/1962 | Ercoli | 260—397.4 |
| 3,047,591 | 7/1962 | Petrow et al. | 260—397.4 |
| 3,084,174 | 4/1963 | Patchett et al. | 260—397.4 |

FOREIGN PATENTS 802,005   9/1958   Great Britain.

OTHER REFERENCES

Lowenthal: "Tetrahedron" (1959), vol. 6, No. 4, page 291.

Villotti et al.: "J. Am. Chem. Soc.," vol. 81, Sept 5, 1959, pages 4566–70.

LEWIS GOTTS, *Primary Examiner.*

MORRIS LIEBMAN, IRVING MARCUS, *Examiners.*